(12) United States Patent
Mihara

(10) Patent No.: US 10,569,667 B2
(45) Date of Patent: Feb. 25, 2020

(54) VEHICLE SEAT

(71) Applicant: TACHI-S CO., LTD., Akishima-shi, Tokyo (JP)

(72) Inventor: Kazuhiro Mihara, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/055,044

(22) Filed: Aug. 4, 2018

(65) Prior Publication Data

US 2019/0061559 A1 Feb. 28, 2019

(30) Foreign Application Priority Data

Aug. 28, 2017 (JP) ................. 2017-163167

(51) Int. Cl.
| | |
|---|---|
| *B60N 2/00* | (2006.01) |
| *B60N 2/06* | (2006.01) |
| *B60N 2/07* | (2006.01) |
| *B60R 21/01* | (2006.01) |
| *G01G 19/41* | (2006.01) |
| *G01G 19/414* | (2006.01) |
| *B60R 21/015* | (2006.01) |

(52) U.S. Cl.
CPC .............. *B60N 2/002* (2013.01); *B60N 2/06* (2013.01); *B60N 2/0705* (2013.01); *B60N 2/0722* (2013.01); *B60N 2/0732* (2013.01); *B60R 21/0152* (2014.10); *G01G 19/4142* (2013.01)

(58) Field of Classification Search
CPC . B60N 2/002; B60N 2/06; B60N 2/07; B60N 2/0705; B60N 2/0722; B60N 2/0725; B60N 2/0732; B60R 21/01516; B60R 21/0152; G01G 19/4142
See application file for complete search history.

(56) References Cited

U.S. PATENT DOCUMENTS

| | | | | |
|---|---|---|---|---|
| 2005/0284668 A1* | 12/2005 | Hida | ...................... | B60N 2/002 177/136 |
| 2006/0010984 A1* | 1/2006 | Yamazaki | .............. | B60N 2/002 73/761 |
| 2006/0107767 A1* | 5/2006 | Kawabata | .............. | B60N 2/002 73/862.627 |

(Continued)

FOREIGN PATENT DOCUMENTS

| | | |
|---|---|---|
| JP | 2014-028590 A | 2/2014 |
| JP | 2014-034372 A | 2/2014 |

(Continued)

*Primary Examiner* — Ryan D Kwiecinski
(74) *Attorney, Agent, or Firm* — SGPatents PLLC

(57) ABSTRACT

A vehicle seat includes a seat cushion that includes a seat cushion frame, a riser that supports the seat cushion frame, a seat position adjusting device that moves and adjusts the seat cushion back and forth, and a load detector that detects a load applied to the seat cushion. The riser includes a bottom wall and a sidewall that extends upward from an end portion of the bottom wall. The seat position adjusting device includes an upper rail that supports the riser and slides a lower rail. The load detector is positioned between the upper rail and the bottom wall. The upper rail, the load detector, the bottom wall, and the bracket are co-clamped with a first fastening member, and the bracket is secured to the sidewall with a second fastening member.

6 Claims, 5 Drawing Sheets

(56) References Cited

U.S. PATENT DOCUMENTS

| | | | | |
|---|---|---|---|---|
| 2006/0180359 A1* | 8/2006 | Wolfe | ............... | G01G 19/4142 |
| | | | | 177/144 |
| 2007/0057527 A1* | 3/2007 | Endo | ............... | B60N 2/002 |
| | | | | 296/65.13 |
| 2008/0007100 A1* | 1/2008 | Kawabata | ............... | B60N 2/002 |
| | | | | 297/217.2 |
| 2009/0139774 A1* | 6/2009 | Takayasu | ............... | B60N 2/002 |
| | | | | 177/136 |
| 2012/0073369 A1* | 3/2012 | Suzuki | ............... | G01D 5/145 |
| | | | | 73/431 |
| 2013/0076085 A1* | 3/2013 | Speck | ............... | B60N 2/0705 |
| | | | | 297/216.1 |
| 2014/0035335 A1* | 2/2014 | Akutsu | ............... | B60N 2/002 |
| | | | | 297/217.2 |
| 2014/0042789 A1 | 2/2014 | Kitaguchi et al. | | |
| 2015/0185067 A1* | 7/2015 | Kirita | ............... | G01G 19/4142 |
| | | | | 177/136 |
| 2016/0107596 A1* | 4/2016 | Park | ............... | B60N 2/002 |
| | | | | 73/865 |
| 2016/0144746 A1* | 5/2016 | Couasnon | ............... | B60N 2/0705 |
| | | | | 384/34 |
| 2017/0246966 A1* | 8/2017 | Hayashi | ............... | B60N 2/002 |
| 2018/0334056 A1* | 11/2018 | Nagatani | ............... | B60N 2/0244 |
| 2018/0334058 A1* | 11/2018 | Nagatani | ............... | B60N 2/002 |
| 2018/0340849 A1* | 11/2018 | Fujii | ............... | G01L 1/2231 |

FOREIGN PATENT DOCUMENTS

| | | | | |
|---|---|---|---|---|
| JP | 2014-172581 A | 9/2014 | | |
| WO | WO-2006011598 A1 * | 2/2006 | ............ | B60N 2/002 |

* cited by examiner

VEHICLE SEAT

CLAIM OF PRIORITY

The present application claims priority from Japanese patent application JP2017-163167 filed on Aug. 28, 2017, the content of which is hereby incorporated by reference into this application.

BACKGROUND

This disclosure relates to a vehicle seat, and is applicable to a vehicle seat that includes, for example, a seat load detecting device.

There has been known a vehicle seat that includes a load detector for deploying an air bag in a vehicle collision, the load detector including a load sensor disposed between a seat cushion of a seat of a vehicle and a vehicle floor to determine a load body acting on the seat of the vehicle based on a load detected by the load sensor. For example, when it is determined that an adult is seated on a front passenger seat, the air bag is set to be deployable, and when it is determined that there is no occupant seated on the seat of the vehicle or a child is seated, the air bag is set to be undeployable (JP2014-172581).

SUMMARY

The load sensor (the load detector) receives an external force due to a kick from a rear seat and a foreign object or the like on a floor depending on a mounted position in some cases.

It is an object of this disclosure to provide a vehicle seat in which a load detector is protected.

Other objects and novel features will become clear by descriptions and attached drawings in this Description.

An outline of a representative one of this disclosure is briefly described as follows.

That is, a vehicle seat includes a seat cushion that includes a seat cushion frame, a riser that supports the seat cushion frame, a seat position adjusting device that moves and adjusts the seat cushion back and forth, a load detector that detects a load applied to the seat cushion, and a bracket. The riser includes a bottom wall and a sidewall that extends upward from an end portion of the bottom wall. The seat position adjusting device includes a lower rail secured to a floor of a vehicle, and an upper rail that supports the riser and slides along the lower rail. The load detector is positioned between the upper rail and the bottom wall. The bracket is positioned on a top surface of the bottom wall. The upper rail, the load detector, the bottom wall, and the bracket are co-clamped with a first fastening member, and the bracket is secured to the sidewall with a second fastening member.

With the above-described vehicle seat, the load detector can be protected.

DESCRIPTION OF THE PREFERRED EMBODIMENTS

Figure 1:
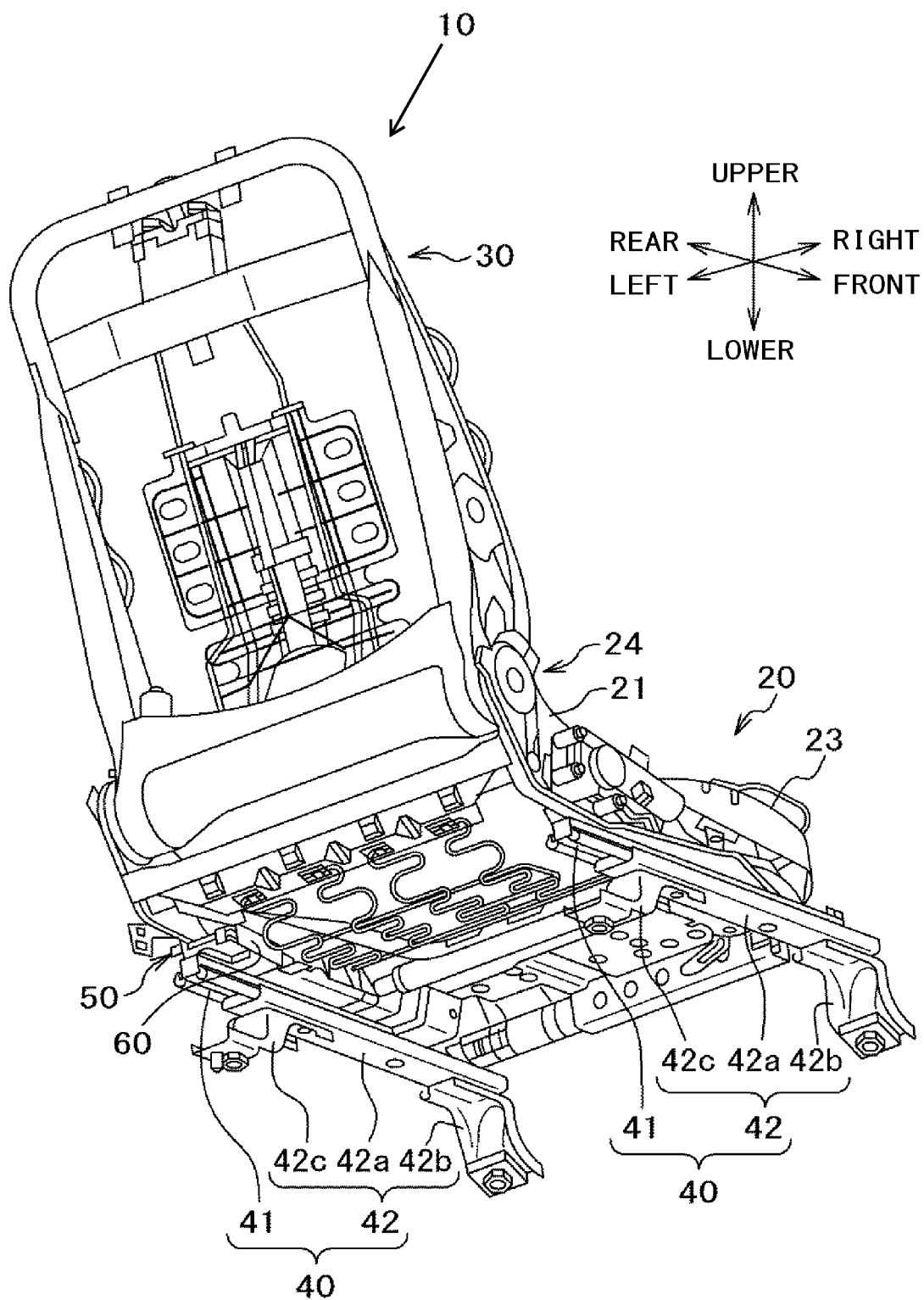
FIG. 1 is a perspective view describing an exemplary configuration of a seat frame viewed from a right lower rear side.

The following describes an embodiment by referring to the drawings. Note that, in the following description, identical reference numerals designate components having identical functions or configurations, and therefore overlapping explanation is omitted in some cases. For clearer explanations, the drawings are schematically illustrated in width, thickness, shape, and similar factor of each unit compared with an actual aspect in some cases. However, they are merely examples, and not intended to limit interpretations of the present invention.

Embodiment

First, a structure of a vehicle seat according to an embodiment will be described by referring to FIG. 1. FIG. 1 is a perspective view describing an exemplary configuration of a seat frame viewed from a right lower rear side. For ease of understanding a structure of the vehicle seat, directions of "front," "rear," "left," "right," "upper," and "lower" are indicated in the drawings, and these directions are used for expressing relative positional relationships in the following description. These directions correspond to directions of a vehicle when the vehicle seat is mounted to the vehicle, and for example, a front direction of the vehicle seat is identical to a front direction of the vehicle. While the following describes the structure of the vehicle seat appropriate for a front passenger seat positioned on a right front side, the structure is applicable to a front passenger seat positioned on a left front side. The vehicle seat mounted on the left side of the vehicle has a configuration where the right and left sides of the vehicle seat mounted on the right side are interchanged.

The vehicle seat according to the embodiment includes a seat cushion configured to move back and forth, and a seat back tiltable with respect to the seat cushion. The seat cushion and the seat back include a seat frame 10 as illustrated in FIG. 1. The seat frame 10 includes a seat cushion frame 20 that constitutes a frame of the seat cushion, and a seat back frame 30 that constitutes a frame of the seat back. The seat cushion is configured such that the seat cushion frame 20 is covered with a seat cushion pad made of a cushion material such as urethane and a skin material made of synthetic leather, a fabric, or similar material. The seat back is configured such that the seat back frame 30 is covered with a seat back pad made of a cushion material such as urethane and a skin material made of synthetic leather, a fabric, or similar material.

The seat cushion frame 20 is a frame formed in an approximately rectangular frame shape, and disposed on respective upper rails 41 supported to be movable back and forth with respect to a pair of right and left lower rails 42 disposed on a floor of the vehicle. This ensures an adjustment of a front-rear position of the vehicle seat.

The seat cushion frame 20 is supported by a load detector 50 disposed on a top surface of a rear end portion of the left upper rail 41 extending in the front-rear direction. This ensures detecting a weight of an occupant by the load detector 50.

The seat back frame 30 has a lower portion turnably coupled to a rear portion of the seat cushion frame 20 via a reclining mechanism 24. This ensures the seat back to be tiltable in the front-rear direction with respect to the seat cushion.

On a right side above the vehicle seat mounted to the vehicle, a retractor (not illustrated) of a seat belt device is mounted and fixed. A webbing is extracted from the retractor and coupled to an anchor portion (not illustrated) disposed on the right side below the vehicle seat. Through a middle part of the webbing extracted from the retractor, a tongue plate (not illustrated) is inserted. The tongue plate is removable from/attachable to a buckle (not illustrated) coupled to a side frame portion on a left side via an anchor portion (not illustrated).

Next, the seat cushion frame will be described in detail.

As illustrated in FIG. 1, the seat cushion frame 20 mainly includes a pair of right and left side frames 21, a pair of right and left upper risers 22, a pan frame 23, a pair of front and rear coupling pipes (not illustrated).

The side frames 21 are metallic frames extending in the front-rear direction, and separately disposed on the right and left sides. The side frame 21 has a front end portion coupled with the metallic pan frame 23 and the metallic front coupling pipe, and a rear end portion coupled with the metallic rear coupling pipe.

On a lower side of the seat cushion frame 20, a seat position adjusting device 40 is disposed to adjust the front-rear position of the seat cushion with respect to the vehicle. The seat position adjusting device 40 includes a pair of right and left upper rails 41 secured to the lower side of the seat cushion frame 20, and lower rails 42 secured to the floor of the vehicle. The upper rails 41 are secured to the upper risers 22 (see FIG. 2) disposed at a lower portion of the seat cushion frame 20. The lower rail 42 includes a rail portion 42a engaged with the upper rail 41 to slide the upper rail 41, and fastening portions 42b and 42c that fasten the rail portion 42a to the floor. Sliding the upper rail 41 on the lower rail 42 ensures adjusting the front-rear position of the seat cushion with respect to the vehicle, that is, the front-rear position of the vehicle seat with respect to the vehicle.

Figure 2:
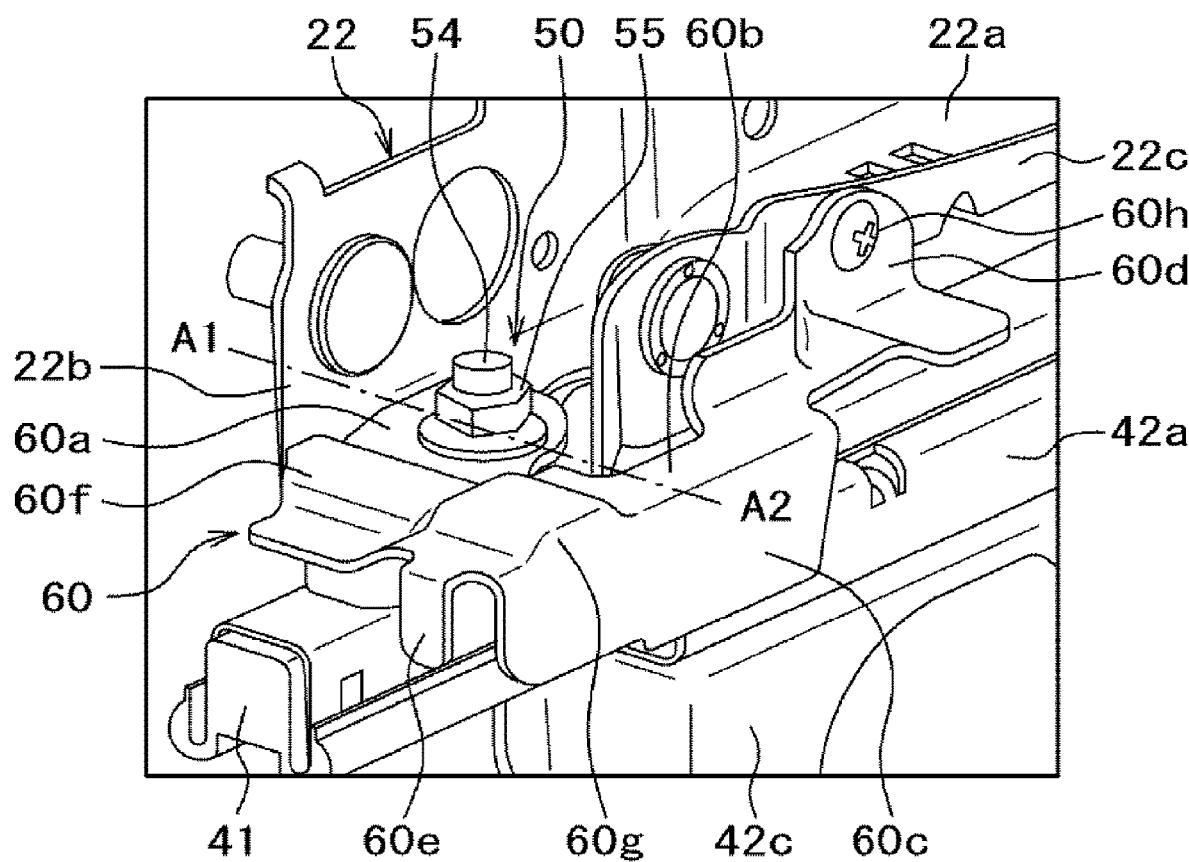
FIG. 2 is a perspective view illustrating a left side rear portion of the seat frame in FIG. 1 viewed from a right rear side.
Figure 3:
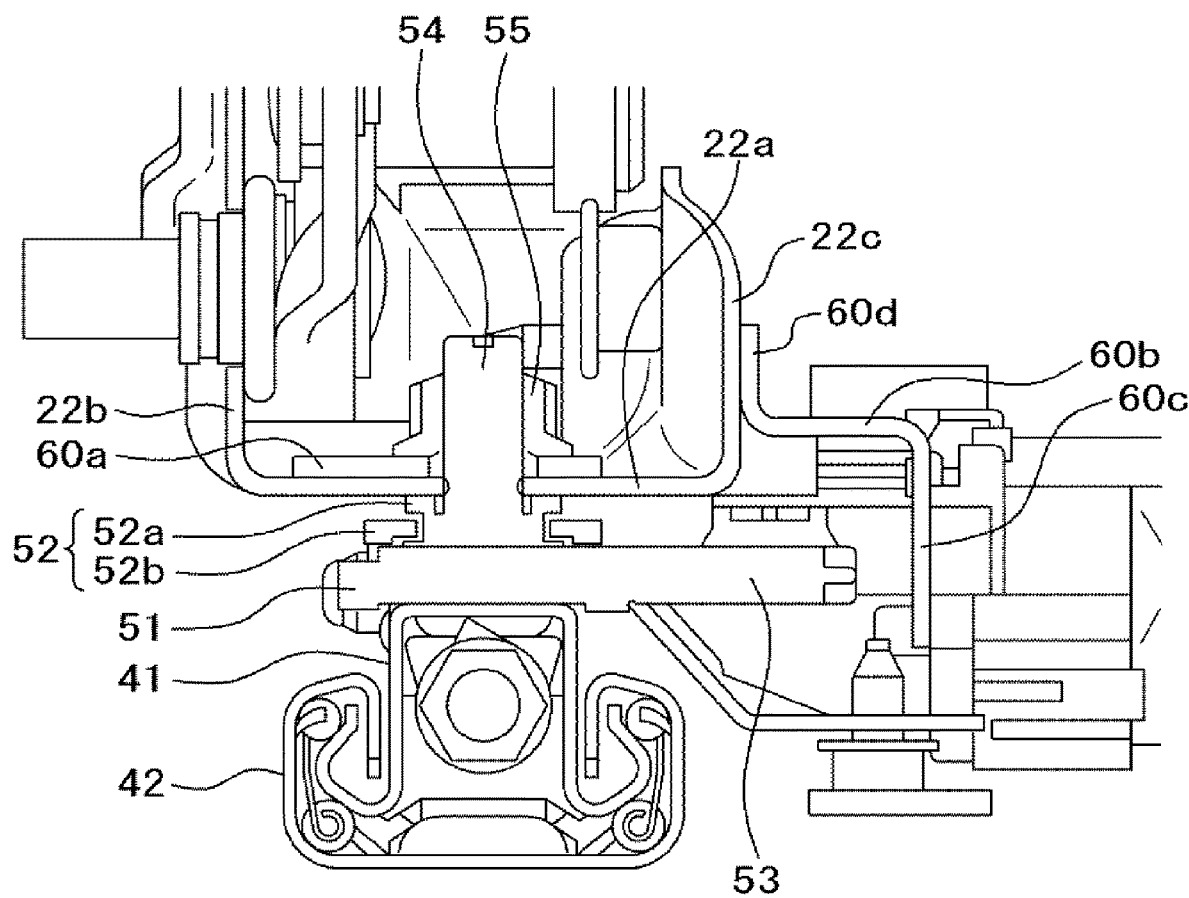
FIG. 3 is a vertical cross-sectional view taken along a line A1-A2 in FIG. 2.
Figure 4:
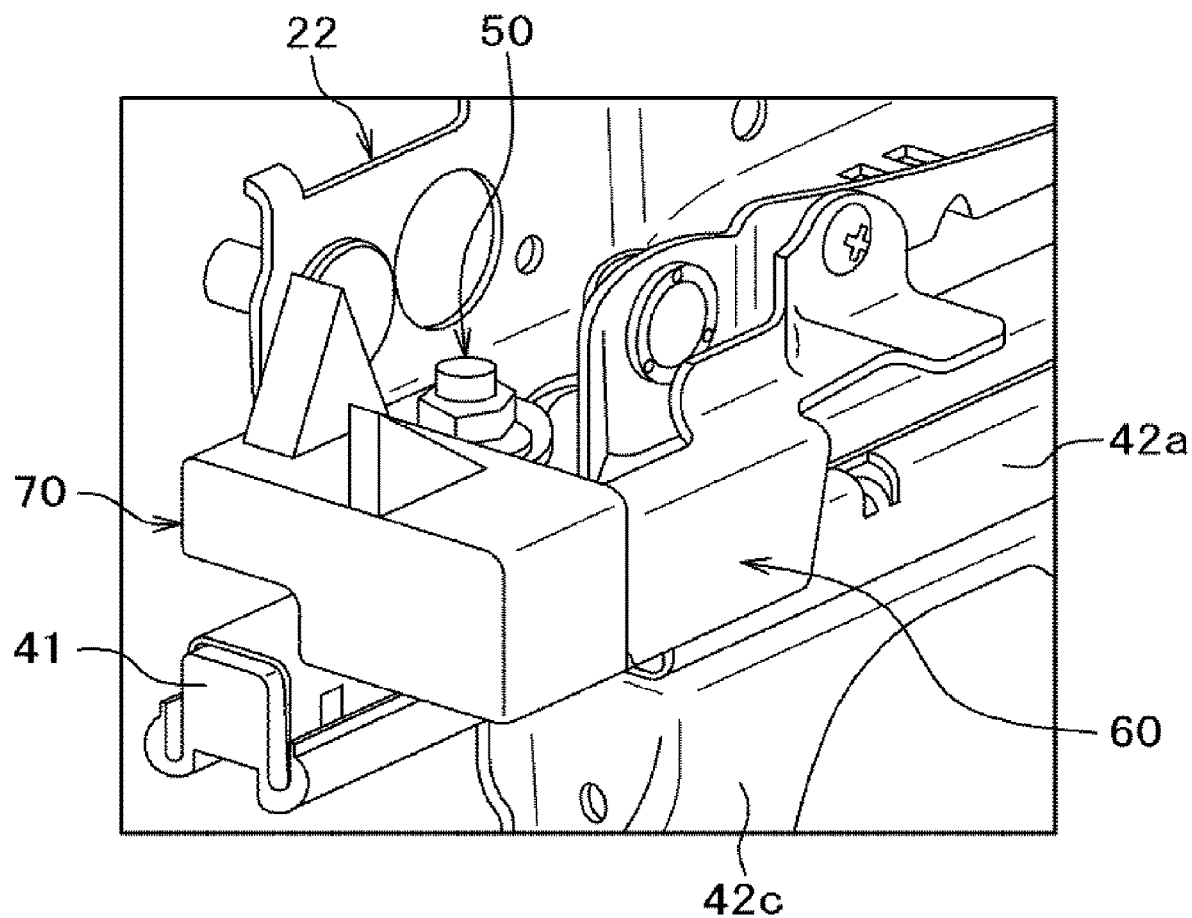
FIG. 4 is a drawing illustrating a state where a cover is mounted to the structure in FIG. 2.

FIG. 2 is a perspective view illustrating a left side rear portion of the seat frame in FIG. 1 viewed from a right rear side. FIG. 3 is a vertical cross-sectional view taken along a line A1-A2 in FIG. 2. FIG. 4 is a drawing illustrating a state where a cover is mounted to the structure in FIG. 2.

The upper riser 22 includes a bottom wall 22a to which the load detector 50 is mounted, an outer sidewall 22b extending upward from an end portion at an outer side in a right-left direction of the bottom wall 22a, and an inner sidewall 22c extending upward from an end portion of the bottom wall 22a on an inner side in the right-left direction.

The load detector 50 includes a plate-shaped base member 51, which is long in the front-rear direction, a sensing unit 52 disposed in the approximately center of the base member 51 in the front-rear direction, and a base unit 53 that processes a signal sensed by the sensing unit 52. A wiring cable (not illustrated) is extracted from the base unit 53. The load detector 50 is disposed between the upper rail 41 and the bottom wall 22a of the upper riser 22. A bolt 54 is inserted through a hole of the upper rail 41 from the lower side and holes provided in the centers of the base member 51 and the sensing unit 52 from the lower side to project upward. The bolt 54 is fastened to the bottom wall 22a of the upper riser 22 with a nut 55, thus detecting a load from the upper riser 22 by the sensing unit 52 via the bolt 54. The sensing unit 52 includes a strain element 52a and a strain gauge 52b bonded on a lower surface of the strain element 52a. A sheet metal bracket 60 is disposed between a top surface of the bottom wall 22a of the upper riser 22 and the nut 55.

The base member 51 has front and rear end portions fastened to the upper rail 41 with bolts and nuts. The bottom wall 22a of the upper riser 22 has escape holes disposed on portions corresponding to the positions of distal end portions of the bolts and the nuts to avoid interferences with the nuts.

As illustrated in FIG. 3, the center of the sensing unit 52 in a width direction is positioned at approximately center of the upper riser 22 in a width direction, and the base unit 53 projects inward in a seat width direction from the end portion of the upper riser 22.

The bracket 60 has a first top surface portion 60a that is positioned between the outer sidewall 22b and the inner sidewall 22c and has the hole through which the bolt 54 passes, and a second top surface portion 60b positioned inside the inner sidewall 22c. The bracket 60 has a side surface portion 60c extending downward from a right-side end portion of the second top surface portion 60b, a side surface portion 60d extending upward from a left-side end portion of the second top surface portion 60b, and a rear surface portion 60e extending downward from a rear-side end portion of the second top surface portion 60b. The first top surface portion 60a and the second top surface portion 60b have rear portions where beads 60f and 60g are disposed. The side surface portion 60d is fastened to the inner sidewall 22c with a screw 60h.

As illustrated in FIG. 4, a resin cover 70 is mounted over the rear portion of the first top surface portion 60a, the side surface portion 60c, and the rear surface portion 60e. The resin cover 70 has a top where fins in triangle pole shapes are disposed to prevent feet of an occupant on the rear seat and similar object from entering under the front seat.

Figure 5:
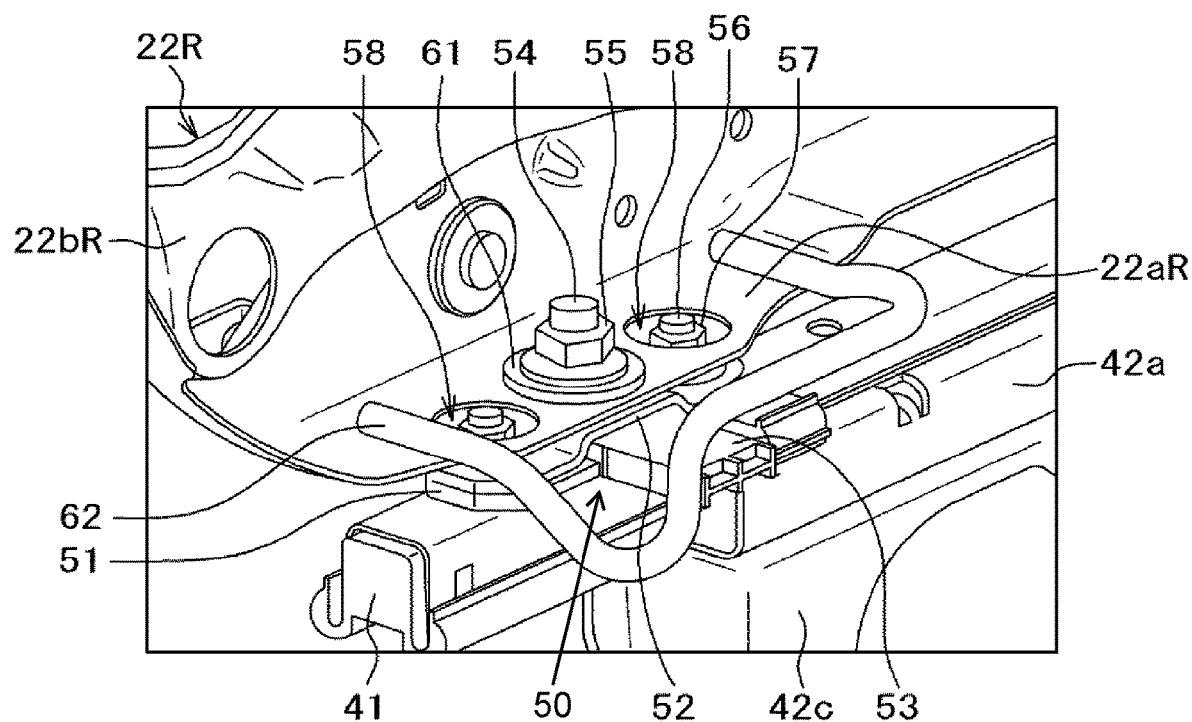
FIG. 5 is a perspective view illustrating a left side rear portion of a seat frame according to a comparative example viewed from a right rear side.

Next, a vehicle seat according to a comparative example will be described by referring to FIG. 5. FIG. 5 is a perspective view illustrating a left side rear portion of a seat frame according to the comparative example viewed from a right rear side.

An upper riser 22R includes a bottom wall 22aR, to which the load detector 50 is mounted, and an outer sidewall 22bR extending upward from an end portion at an outer side in the right-left direction of the bottom wall 22aR.

The load detector 50 includes a plate-shaped base member 51 long in the front-rear direction, a sensing unit 52 disposed in the approximately center of the base member 51 in the front-rear direction, and a base unit 53 that processes a signal sensed by the sensing unit 52. A wiring cable (not illustrated) is extracted from the base unit 53. The load detector 50 is disposed between the upper rail 41 and the bottom wall 22aR of the upper riser 22R. A bolt 54 is inserted through a hole of the upper rail 41 from the lower side and holes disposed in the centers of the base member 51 and the sensing unit 52 from the lower side to project upward. The bolt 54 is fastened to the bottom wall 22aR of the upper riser 22R with a nut 55, thus detecting a load from the upper riser 22R by the sensing unit 52 via the bolt 54. A washer 61 is disposed between a top surface of the bottom wall 22aR of the upper riser 22R and the nut 55.

The base member 51 has front and rear end portions fastened to the upper rail 41 with bolts 56 and nuts 57. The bottom wall 22aR of the upper riser 22R has escape holes 58 disposed on portions corresponding to the positions of distal end portions of the bolts 56 and the nuts 57 to avoid interferences with the nuts 57.

A wire 62 as a protective member is fixedly secured ahead of the front escape hole 58 of the bottom wall 22*a*R, extends to the right side in the right-left direction, extends to the rear side in the front-rear direction at its end portion, extends to the left side in the right-left direction at its end portion, and is welded at the rear of the rear escape hole 58. The part of the wire 62 extending in the front-rear direction is positioned above the base unit 53.

While the comparative example where the load detector is protected by the wire is excellent in cost compared with the sheet metal bracket in the embodiment, the embodiment is excellent compared with the comparative example in reinforcement in a belt anchor test and protection from the feet entering and the like.

In the embodiment, the bracket 60 is configured to be co-clamped to the upper rail 41, the upper riser 22, and the load detector 50 with the bolt 54, and screwed to the upper riser 22. This prevents the load detector 50 from receiving the external force due to a kick from the rear seat and a foreign object on a floor to ensure maintaining the normal detection by the load detector 50.

The bracket 60 is covered over the rear end top surface of the upper riser 22, and the beads 60*f* and 60*g* are disposed on this part, thus maintaining the strength in an upward direction. This ensures the reinforcement of the seat belt anchor mounted to the upper riser 22.

The bracket 60 has a structure where the resin cover 70 with the fins is mounted, and the resin cover 70 can prevent the entering of the feet from the rear seat.

The one bracket 60 having the protective function (the protective member) of the load detector 50, the reinforcing function (the reinforcing member) in the belt anchor test, and the fin mounting function (the mounting member) ensures using existing designs, thus reducing the increase in the number of components to minimum.

While the invention made by the inventors has been specifically described based on the embodiment, this invention is not limited to the above-described embodiment, and obviously, variously changeable.

What is claimed is:

1. A vehicle seat comprising:
    a seat cushion that includes a seat cushion frame;
    a riser that supports the seat cushion frame;
    a seat position adjusting device that moves and adjusts the seat cushion back and forth;
    a load detector that detects a load applied to the seat cushion; and
    a bracket,
    wherein the riser includes:
        a bottom wall; and
        a sidewall that extends upward from an end portion of the bottom wall,
    the seat position adjusting device includes:
        a lower rail secured to a floor of a vehicle; and
        an upper rail that supports the riser and slides along the lower rail,
    the load detector is positioned between the upper rail and the bottom wall,
    the bracket is positioned on a top surface of the bottom wall,
    the upper rail, the load detector, the bottom wall, and the bracket are co-clamped with a first fastening member, and
    the bracket is secured to the sidewall with a second fastening member.

2. The vehicle seat according to claim 1,
    wherein the sidewall includes:
        an outer sidewall that extends upward from an end portion at an outer side in a right-left direction of the bottom wall; and
        an inner sidewall that extends upward from an end portion at an inner side in the right-left direction of the bottom wall, and
    the bracket is secured to the inner sidewall with the second fastening member.

3. The vehicle seat according to claim 2,
    wherein the bracket includes:
        a first top surface portion positioned between the outer sidewall and the inner sidewall, the first top surface portion having a hole through which the first fastening member passes;
        a second top surface portion positioned inside the inner sidewall; and
        a first side surface portion that extends upward from a left-side end portion of the second top surface portion, the first side surface portion having a hole through which the second fastening member passes.

4. The vehicle seat according to claim 3,
    wherein the first top surface portion and the second top surface portion each have a bead.

5. The vehicle seat according to claim 4,
    wherein the bracket further includes:
        a second side surface portion that extends downward from a right-side end portion of the second top surface portion; and
        a rear surface portion that extends downward from a rear-side end portion of the second top surface portion.

6. The vehicle seat according to claim 5, further comprising a resin cover mounted to the first top surface portion, the second side surface portion, and the rear surface portion,
    wherein the resin cover has a top on which a fin in a triangle pole shape is disposed.

* * * * *